(12) United States Patent
Ruiz et al.

(10) Patent No.: US 10,860,263 B1
(45) Date of Patent: Dec. 8, 2020

(54) METHODS AND SYSTEMS FOR DYNAMICALLY CONFIGURING A DECURLER SUBSYSTEM OF A PRINT DEVICE

(71) Applicant: Xerox Corporation, Norwalk, CT (US)

(72) Inventors: Erwin Ruiz, Rochester, NY (US); Rachel Lynn Tanchak, Rochester, NY (US); Roberto Irizarry, Rochester, NY (US); Carlos M. Terrero, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/456,520

(22) Filed: Jun. 28, 2019

(51) Int. Cl.
*H04N 1/00* (2006.01)
*G06F 3/12* (2006.01)

(52) U.S. Cl.
CPC .......... *G06F 3/1205* (2013.01); *G06F 3/1257* (2013.01); *G06F 3/1273* (2013.01)

(58) Field of Classification Search
CPC ..... G06F 3/1205; G06F 3/1257; G06F 3/1273
USPC ........................................................ 358/1.13
See application file for complete search history.

(56) References Cited

U.S. PATENT DOCUMENTS

| | | | |
|---|---|---|---|
| 6,970,804 B2 | 11/2005 | Siegel et al. | |
| 7,421,371 B2 | 9/2008 | Segers et al. | |
| 8,505,004 B2 | 8/2013 | Burke, Jr. | |
| 8,537,398 B2 | 9/2013 | Burke, Jr. | |
| 8,593,676 B2 | 11/2013 | Burke, Jr. | |
| 8,730,502 B2 | 5/2014 | Burke, Jr. | |
| 8,810,821 B2 | 8/2014 | Burke, Jr. | |
| 8,982,391 B2 | 3/2015 | Burke, Jr. et al. | |
| 9,171,295 B2 | 10/2015 | Burke, Jr. et al. | |
| 10,019,205 B2 | 7/2018 | Burke, Jr. et al. | |
| 2018/0136599 A1* | 5/2018 | Shiokawa | B65H 29/70 |

* cited by examiner

*Primary Examiner* — Saeid Ebrahimi Dehkordy
(74) *Attorney, Agent, or Firm* — Fox Rothschild LLP

(57) ABSTRACT

A system of configuring a decurler subsystem of a print device includes an electronic device, and a computer-readable storage medium having one or more programming instructions that, when executed, cause the electronic device to receive from a print device via a communication network, one or more job parameters associated with a print job that is to be processed by a print device, access a historical print job data store comprising one or more historical job parameters associated with one or more historical print jobs processed by the print device or one or more other print devices that are in communication with the electronic device, compare at least a portion of the received job parameters to at least a portion of the historical job parameters to identify one or more recommended job parameters for the print job, and determine an updated decurler transfer function based on the recommended job parameters.

21 Claims, 15 Drawing Sheets

Profile sensor output:

Decurler1 indentation: fn

Decurler2 indentation: fn

| Machine S/N | Temperature [F] | Humidity [%RH] | Grain Direction | Media Weight [gsm] | Media Size |
|---|---|---|---|---|---|
| 12345 | 70 | 10 | Long | 44 | 11x17 |
| 12345 | 70 | 10 | Long | 44 | 11x17 |
| 12345 | 80 | 80 | Long | 44 | 11x17 |
| 12345 | 80 | 80 | Long | 44 | 11x17 |
| 67890 | 65 | 12 | Short | 52 | SRA3 |
| 67890 | 65 | 12 | Long | 52 | SRA3 |
| 67890 | 70 | 10 | Short | 52 | SRA3 |
| 67890 | 70 | 10 | Long | 52 | SRA3 |
| 23456 | 80 | 30 | Short | 90 | A3 |
| 23456 | 80 | 30 | Short | 90 | A3 |
| 23456 | 80 | 30 | Short | 90 | A3 |
| 23456 | 80 | 30 | Short | 90 | A3 |
| 78901 | 70 | 10 | Long | 59 | 12x18 |
| 78901 | 70 | 10 | Short | 59 | 12x18 |
| 78901 | 70 | 10 | Long | 59 | 12x18 |
| 78901 | 70 | 10 | Short | 59 | 12x18 |
| 34567 | 68 | 15 | Short | 120 | A4 |

| | | | | |
|---|---|---|---|---|
| 34567 | 68 | 15 | Short | A4 |
| 34567 | 68 | 15 | Long | A4 |
| 34567 | 68 | 15 | Long | A4 |
| 89012 | 70 | 10 | Long | SRA3 |
| 89012 | 80 | 80 | Long | SRA3 |
| 89012 | 70 | 10 | Short | SRA3 |
| 89012 | 80 | 80 | Short | SRA3 |
| 45678 | 55 | 8 | Short | A4 |
| 45678 | 60 | 10 | Long | A3 |
| 45678 | 65 | 10 | Long | A4 |
| 45678 | 70 | 10 | Short | A3 |
| 90123 | 75 | 12 | Long | 11x17 |
| 90123 | 75 | 12 | Short | SRA3 |
| 90123 | 75 | 12 | Short | SRA3 |
| 90123 | 75 | 12 | Long | 11x17 |

FROM FIG. 9A
TO FIG. 9C
TO FIG. 9E

| | | FROM FIG. 9B | | | TO FIG. 9F |
|---|---|---|---|---|---|
| 56789 | 70 | 10 | Long | 52 | A3 |
| 56789 | 70 | 10 | Long | 52 | A3 |
| 56789 | 80 | 70 | Long | 52 | A3 |
| 56789 | 80 | 70 | Long | 52 | A3 |
| 01234 | 70 | 10 | Long | 44 | 11x17 |
| 01234 | 60 | 10 | Short | 44 | 11x17 |
| 01234 | 70 | 10 | Long | 44 | 11x17 |
| 01234 | 70 | 12 | Short | 44 | 11x17 |

FIG. 9C

| Image Area Coverage [%AC] | Coated/Uncoated | Media Brand | Duplex/Simplex? | Decurler 1 Setting | Decurler 2 Setting |
|---|---|---|---|---|---|
| 15 | Uncoated | Catalina | Duplex | 0 | 0 |
| 15 | Uncoated | PakoPharm | Duplex | 5 | 2 |
| 15 | Uncoated | Catalina | Duplex | 0 | 0 |
| 15 | Uncoated | PakoPharm | Duplex | 0 | 0 |
| 35 | Uncoated | Xerox | Simplex | 10 | 0 |
| 35 | Uncoated | Xerox | Simplex | 10 | 0 |
| 35 | Uncoated | Xerox | Simplex | 5 | 0 |
| 35 | Uncoated | Xerox | Simplex | 5 | 2 |
| 20 | Uncoated | Xerox | Simplex | 8 | 2 |
| 20 | Uncoated | Xerox | Simplex | 8 | 2 |
| 20 | Uncoated | Xerox | Simplex | 8 | 2 |
| 20 | Uncoated | Xerox | Simplex | 0 | 0 |
| 50 | Uncoated | Xerox | Simplex | 0 | 0 |
| 50 | Uncoated | Xerox | Simplex | 0 | 0 |
| 50 | Uncoated | Xerox | Simplex | 2 | 2 |
| 40 | Coated | Xerox | Simplex | | |

FIG. 9D

| | | | | | |
|---|---|---|---|---|---|
| 40 | Coated | Xerox | Simplex | 2 | 2 |
| 40 | Coated | Xerox | Simplex | 2 | 2 |
| 40 | Coated | Xerox | Simplex | 2 | 2 |
| 15 | Uncoated | Catalina | Duplex | 0 | 0 |
| 20 | Uncoated | Xerox | Simplex | 6 | 5 |
| 10 | Uncoated | PakoPharm | Duplex | 0 | 0 |
| 25 | Uncoated | Xerox | Simplex | 6 | 5 |
| 35 | Uncoated | Xerox | Simplex | 0 | 0 |
| 35 | Uncoated | Xerox | Simplex | 0 | 0 |
| 25 | Uncoated | Xerox | Simplex | 0 | 0 |
| 25 | Uncoated | Xerox | Simplex | 0 | 0 |
| 15 | Uncoated | Catalina | Duplex | 10 | 10 |
| 15 | Uncoated | Catalina | Duplex | 6 | 8 |
| 20 | Uncoated | Xerox | Simplex | 10 | 10 |
| 20 | Uncoated | Xerox | Simplex | 6 | 8 |

FIG. 9E

| | | | FROM FIG. 9E | | |
|---|---|---|---|---|---|
| 35 | Uncoated | Xerox | Duplex | 0 | 0 |
| 25 | Uncoated | Xerox | Duplex | 0 | 0 |
| 35 | Uncoated | Xerox | Duplex | 0 | 0 |
| 40 | Uncoated | Xerox | Duplex | 0 | 0 |
| 15 | Uncoated | PakoPharm | Duplex | 4 | 3 |
| 10 | Uncoated | PakoPharm | Duplex | 3 | 3 |
| 15 | Uncoated | PakoPharm | Duplex | 6 | 2 |
| 15 | Uncoated | PakoPharm | Duplex | 0 | 8 |

FROM FIG. 9C

FIG. 9F

METHODS AND SYSTEMS FOR DYNAMICALLY CONFIGURING A DECURLER SUBSYSTEM OF A PRINT DEVICE

BACKGROUND

As paper follows a paper path of a print device during processing, it passes through a series of processing stations and/or rollers which can create curl in the paper. Print devices often include a decurler, which introduces curl in a direction opposite of the print path-created curl. The configuration of a decurler can be based on a variety of factors or parameters such as, for example, the path direction, sheet indentation, and environmental conditions, just to name a few. These parameters may vary across different types of media. For example, a lightweight media may be susceptible to curl in an environment with a certain level of humidity, while a heavier weight media may not be susceptible to curl in the same environment. By optimizing these parameters based on media type, a print device may eliminate or greatly minimize the amount of curl of a media.

Many print device applications use media properties and image information to predict the proper parameters of a decurler, such as the direction and an amount of indentation required. And users of the print device can typically specify set points to adjust the amount of decurling through a user interface or device setting.

However, the current implementations have substantial shortcomings. For example, frequently changing set point values can result in undesirable stack quality. Also, users are often required to predict appropriate set points of the first stack of a job and then wait to adjust the set points until the job is finished so as not to disrupt the job. Moreover, current print devices do not learn optimized set points to use to determine future decurling set points for future stacks.

The methods and systems described in this disclosure involve using predictive intelligence to provide a print device with an optimized or otherwise recommended decurler transfer function for a specific print device and/or print job.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system of configuring a decurler subsystem of a print device includes an electronic device, and a computer-readable storage medium. The computer-readable storage medium has one or more programming instructions that, when executed, cause the electronic device to receive from a print device via a communication network, one or more job parameters associated with a print job that is to be processed by a print device, access a historical print job data store comprising one or more historical job parameters associated with one or more historical print jobs processed by the print device or one or more other print devices that are in communication with the electronic device, compare at least a portion of the received job parameters to at least a portion of the historical job parameters to identify one or more recommended job parameters for the print job, determine an updated decurler transfer function based on the recommended job parameters, wherein the decurler transfer function is indicative of one or more characteristics of one or more decurlers of the decurler subsystem of the print device, and send the updated decurler transfer function to the print device to be applied to the decurler subsystem of the print device.

The system may receive as one or more job parameters associated with the print job one or more of the following: a characteristic of a media on which the print job is to be processed, a setting of the print device, a characteristic of a consumable that is needed to process the print job, or a characteristic of the print job.

In an embodiment, the system may receive as one or more job parameters associated with the print job information pertaining to a profile of a media stack that is to be used to process the print job. This information may be obtained from a scanning device of the print device. The scanning device may include one or more of the following: a one-dimensional laser scanner, a two-dimensional laser scanner, a three-dimensional laser scanner, a reflective laser profilometer, or a photoelectric sensor.

In various embodiments, the system may receive as one or more job parameters associated with the print job one or more of the following: temperature information obtained by a temperature sensor of the print device, or humidity information obtained by a humidity sensor of the print device.

Optionally, the system may receive, from one or more of the other print devices, one or more second job parameters, and update the historical print job data store to reflect at least a portion of the second job parameters.

The system may determine an updated decurler transfer function based on the recommended job parameters by applying one or more machine learning methods to at least a portion of the one or more historical job parameters.

In various embodiments, the updated decurler transfer function may include one or more polynomial expressions and one or more coefficients. Each polynomial expression may correspond to a decurler input variable, and each coefficient may correspond to one of the polynomial expressions. The system may apply one or more machine learning methods to at least a portion of the one or more historical job parameters to determine an updated value of one or more of the coefficients. Optionally, the print device may adjust a direction and/or an indentation level of a decurler of a decurler subsystem based on the updated decurler transfer function.

BRIEF DESCRIPTION OF THE DRAWINGS

FIGS. 9A-9F illustrate an example historical print job data store.

DETAILED DESCRIPTION

Figure 1:
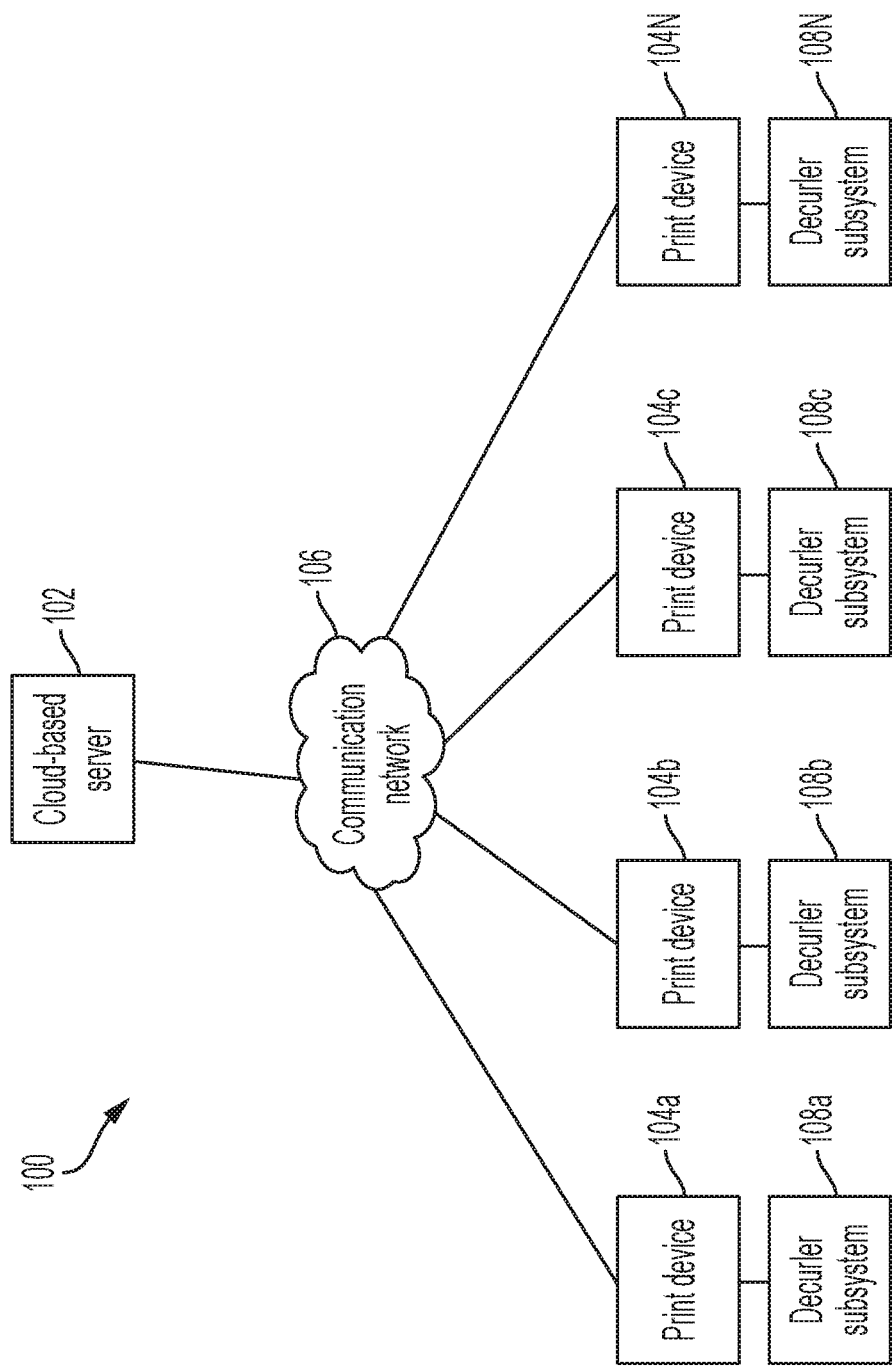
FIG. 1 shows an example system for dynamically configuring a decurler subsystem.

The following terms shall have, for purposes of this application, the respective meanings set forth below:

A "decurler" refers to a mechanism that works to remove the curl from sheets of a print job before or during processing. In various embodiments, a decurler may include two rollers or curved plates over which a sheet passes to counteract curl that may exist in the sheet.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

A "print device" refers to a device capable of performing one or more functions, operations and/or services on a print job. For example, a print device may provide print-related services for one or more print jobs. A print device may include a printer, scanner, multi-function device or other similar equipment.

A "print job" refers to a logical unit of work that is to be completed by one or more print devices or other processing devices. For example, a print job may be a request to print, collate, cut, staple and/or bind a document or set of documents.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

FIG. 1 shows an example system for dynamically configuring a decurler subsystem. As illustrated in FIG. 1, a system 100 may include a cloud-based server 102, one or more print devices 104a-N, and a communication network 106. The print devices 104a-N may communicate with the cloud-based server 102 via the communication network 106. For example, as discussed in more detail below, a print device 104a-N may send one or more system parameters associated with a particular media to the cloud-based server 102 via the communication network 106. A communication network may be a local area network (LAN), a wide area network (WAN), a mobile or cellular communication network, an extranet, an intranet, the Internet and/or the like. As illustrated in FIG. 1, one or more of the print devices 104a-N may have a decurler subsystem 108a-N.

Figure 2:
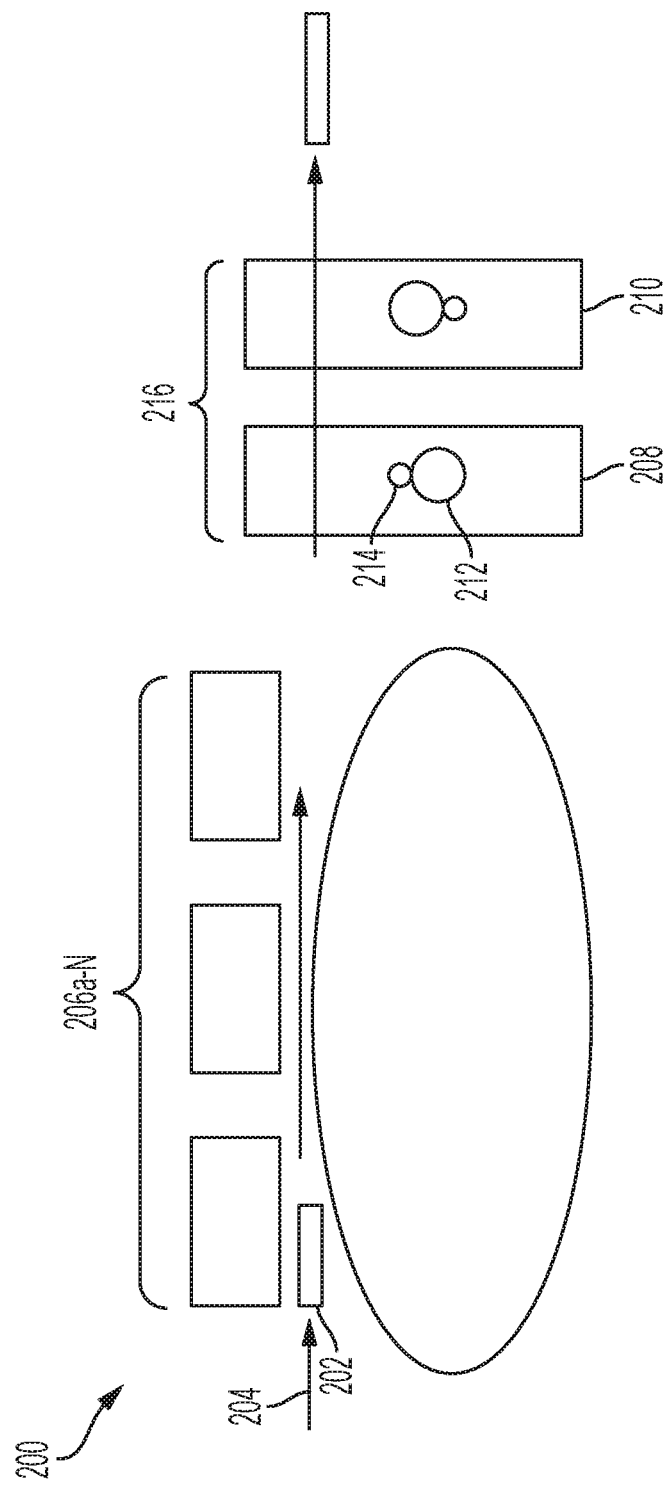
FIG. 2 illustrates an example decurler subsystem of a print device.

FIG. 2 illustrates an example print flow through a print device according to an embodiment. As illustrated by FIG. 2, a print device 200 may process a media sheet 202 along a processing direction 204. The media sheet 202 may be processed by various stations 206a-N such as a marker station, a registration station, a dryer station and/or the like.

In various embodiments, the media sheet 202 may exhibit curl. The curl may be a result of processing by one or more of the stations 206a-N. Alternatively, the curl may have been present in the sheet prior to processing such as, for example, as a result of environmental conditions.

As illustrated in FIG. 2, a print device 200 may include a decurler subsystem 216 having one or more decurlers 208, 210. One decurler 208 may be an upstream or entrance decurler, while another decurler 210 may be a downstream or exit decurler. A media sheet may first be fed through an upstream decurler followed by a downstream decurler. One or more of the decurlers 208, 210 may include two rollers and/or curved plates over which a sheet passes to counteract curl that may exist in the sheet. One roller may be a harder roller with a relatively smaller radius. The other roller may be a softer roller with a relatively larger roller. The two rollers may be moved together to form a nip where the rollers contact one another and where a media sheet may be fed. For example, one arrangement of a decurler may have a pair of rollers, a feeding roller and an indenting shaft that form a nip between the two for the passage of a sheet between the rollers. In various embodiments, a decurler 208, 210 may be driven by one or more motors. Each decurler may be set with a specific value which may correlate to the magnitude of the curl that is added or removed from a sheet of media.

Figure 3:
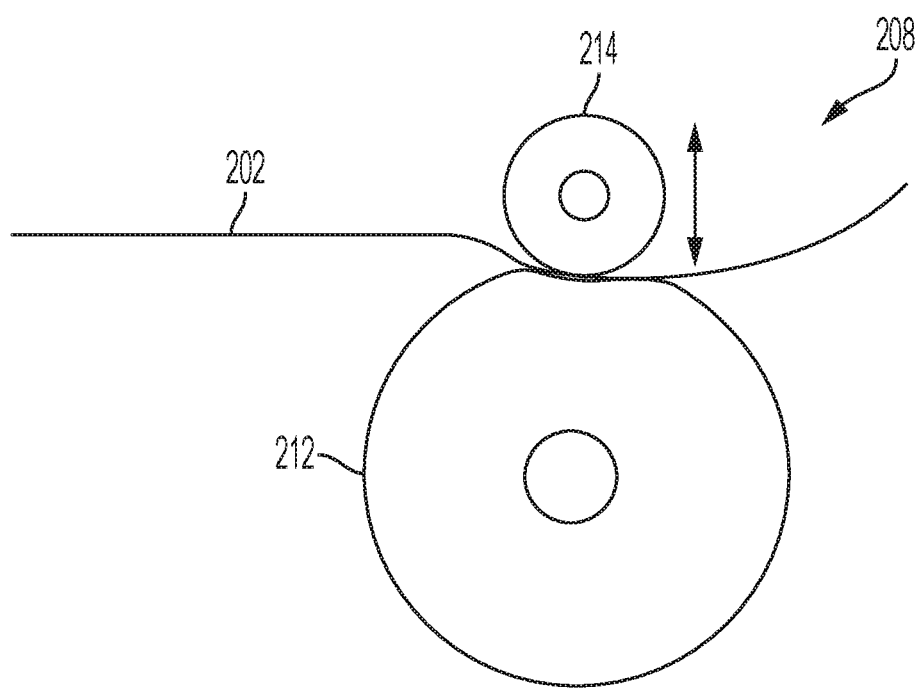
FIG. 3 illustrates an example indentation according to an embodiment.

FIG. 3 illustrates the upstream decurler 208 having a first roller 212 and a second roller 214. The first, larger and softer roller 212, a second, smaller and harder roller 214, and the media sheet 202 being fed through the nip formed by the rollers. This feeding causes the media sheet 202 to indent around the first roller 212 which removes the curl in the media sheet. The first roller 212 may be softer than the second roller 214 such that it may be deformable when pressure is applied. As such, the first roller 212 may be indented when it contacts the second roller 214. A deliberate indentation of a roller may be caused to create a decurling nip through which a sheet may be passed having a particular curvature for that sheet.

In an embodiment, various job parameters may factor into a determination of the appropriate direction and indentation of a decurler for a particular sheet of media or type of media. A job parameter refers to a characteristic of a media on which a print job is processed on, a characteristic or setting of a device or device component used to process a print job, a characteristic of a consumable used to process a print job, and/or a characteristic of a print job itself.

Example job parameters may include, without limitation, the grams per square meter (GSM) of the media, grain direction, temperature, humidity, image location on the media, image type, media weight, media size, media age, ink type, toner type, ink or toner color, altitude, fuser nip, fuser temperature, dryer temperature, media thickness, print job length, machine run time, print job mode (e.g., simplex or duplex), solid stack or offset stacks, short edge feed or long edge feed, cooling settings, media brand, inkjet drop size, toner quality, image area coverage, fuser/dryer set points, and/or media type (e.g., coated, uncoated, treated, untreated, bond, recycled).

In various embodiments, a print device may include one or more sensors which may be used to sense, detect, monitor, measure and/or log one or more job parameter values associated with one or more print jobs.

In an embodiment, a sensor may be a scanning a device. A scanning device refers to a device that may be used to measure one or more characteristics of a surface's profile. Examples of a scanning device may include, without limitation, a one-dimensional laser scanner, a two-dimensional laser scanner, a three-dimensional laser scanner, a reflective laser profilometer and/or a photoelectric sensor. In an embodiment, a scanning device may include one or more laser displacement sensors that may be used to measure displacement and/or position of a media stack.

A scanning device may be positioned in proximity to a media storage area in which media is stored by a print device. For example, in an embodiment, a scanning device may be movable so that it can move and scan a media stack profile. Example media storage areas may include, without limitation, trays, drawers, carriages and/or the like. For instance, a scanning device may be positioned above a media storage area so that the scanning device can scan at least a portion of a top surface of a media that is stored in the media storage area. A scanning device may be movably attached to a print so that it can move and scan a media stack profile. For instance, a scanning device may be attached to one or more rails positioned above a media storage area, which may guide the scanning device's movement about a media stack.

Figure 4:
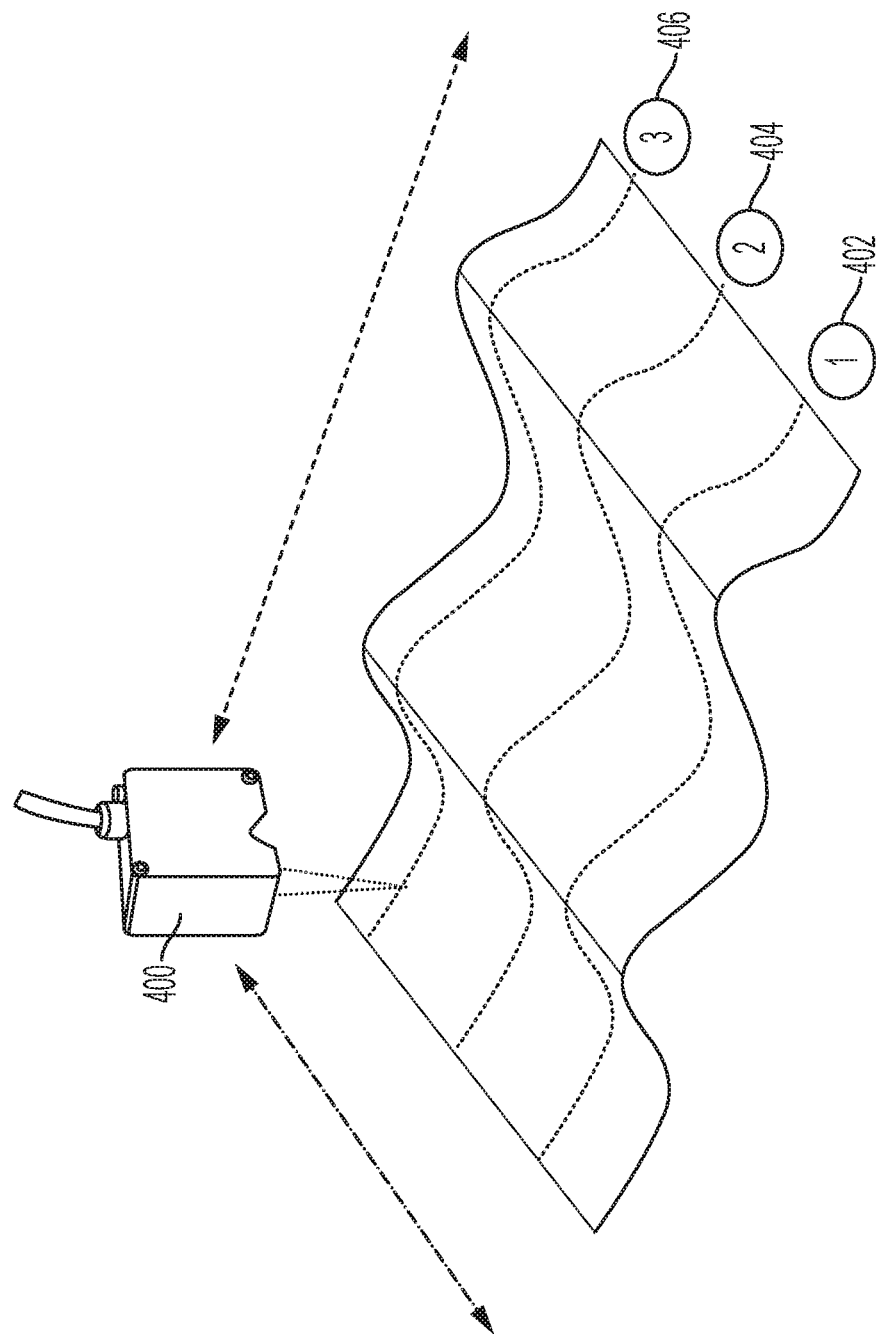
FIG. 4 illustrates an example position of an example laser scanner relative to a media stack.

FIG. 4 illustrates an example position of an example laser scanner relative to a media stack according to an embodiment. As illustrated in FIG. 4, a laser scanner 400 may positioned above a media stack (for simplicity, FIG. 4 only shows a top media sheet of the stack). The laser scanner may be able to move in a first direction, $D_1$, about the top media sheet (e.g., along a length of the sheet). The laser scanner may be able to move in a second direction, $D_2$, about the top media sheet (e.g., along a height of the sheet). In various embodiments, the laser scanner 400 may scan the media stack profile at three locations illustrated as reference numbers 402, 404 and 406. However, it is understood that a laser scanner may scan a media stack profile at different or other locations according to this disclosure.

Figure 5A:
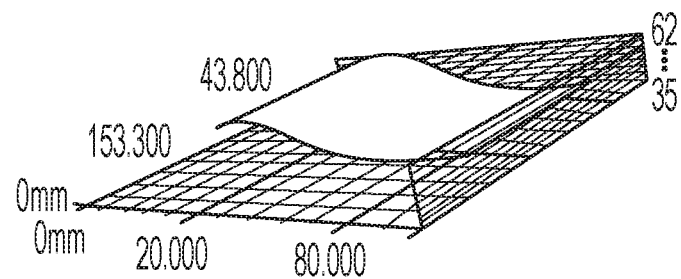
FIG. 5A-5C illustrate example profile measurements.
Figure 5B:
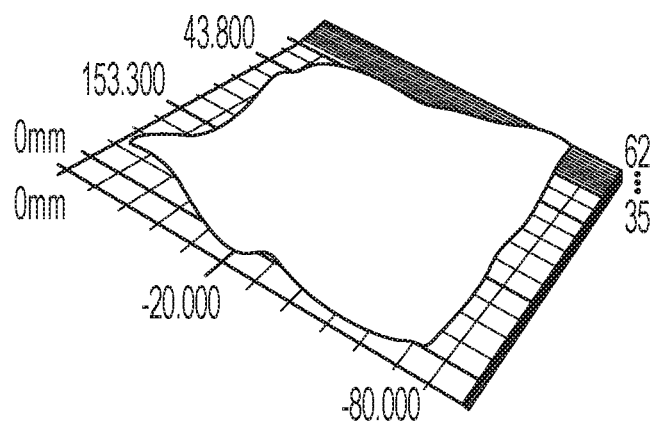
Figure 5C:
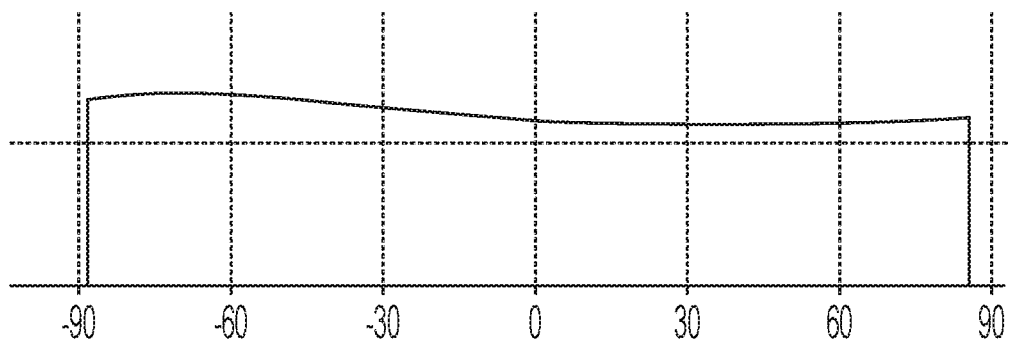

In various embodiments, a scanning device may measure at least a portion of a profile of a media stack. The profile of a media stack may show curl associated with one or more portions of the media stack. A scanning device may generate an image or other visual representation of a profile of a media stack according to an embodiment. The output may include a two-dimensional image of a profile, a three-dimensional image of a profile and/or the like. In other embodiments, the output may include one or more measurements associated with the position or location of the profile of a media stack. FIG. 5A-5C illustrate example profile measurements according to various embodiments.

The output of a scanning device may be considered as one or more job parameters. For example, a print device may cause one or more of its scanning devices to obtain one or more measurements associated with a media stack. The measurements may pertain to one or more segments of the stack's profile. An example measurement may be the height of a vertex in a profile segment. Another example measurement may be the distance to a vertex in the profile segment. A vertex may be a peak or valley of the profile segment. Based on the position of the vertexes, a print device may determine how correlation is needed for a sheet.

Figure 6A:
FIG. 6A illustrates an example visual representation of a stack profile.
Figure 6B:
FIGS. 6B and 6C illustrate example visual representations of an indentation function of a stack profile.
Figure 6C:

A stack profile may be used to determine where a decurler needs to indent to reduce curl associated with the stack. For instance, FIG. 6A illustrates a visual representation of a stack profile according to an embodiment. FIG. 6B illustrates a visual representation of an indentation function of the stack profile for a first decurler of a decurler subsystem, while FIG. 6C illustrates a visual representation of an indentation function of the stack profile for a second decurler of the decurler subsystem. The first decurler may be an entrance decurler, and the second decurler may be an exit decurler. The solid portions in FIG. 6B and FIG. 6C may represent a sheet section where the associated decurler needs to indent to reduce the curl.

A print device may cause a scanning device to scan a media stack at regular intervals, predetermined times, or in response to certain trigger events. For instance, a print device may cause a scanning device to scan at least a portion of a media stack when new media is added to a storage area. As another example, a print device may cause a scanning device to scan at least a portion of a media stack when one or more print jobs are processed. In another example, a print device may cause a scanning device to scan at least a portion of a media stack after the print device has processed a certain number of sheets, during calibration or warm up periods, or as instructed to by an operator. Additional and/or alternate trigger events may be used within the scope of this disclosure. A print device may log and/or send at least a portion of these obtained measurements to a cloud-based server for analysis, as described in more detail below.

In an embodiment, a sensor may be a temperature sensor such as, for example, a thermistor, a resistance thermometer, a thermocouple and/or the like. A temperature sensor may be used to measure a temperature of an area in proximity to a print device at a certain time. For instance, a print device may log a temperature while a print job is being processed.

In an embodiment, a sensor may be a humidity sensor. A humidity sensor may be used to measure a humidity level of an area in proximity to a print device at a certain time. For instance, a print device may log a humidity level while a print job is being processed.

A cloud-based server may aggregate parameters from one or more print devices and use this information to train a machine-learning model maintained by the cloud-based server. In this way, the cloud-based server may better predict optimized decurler settings for one or more media types on one or more print devices, and convey those settings to a print device before the print device processes a print job.

Figure 7:
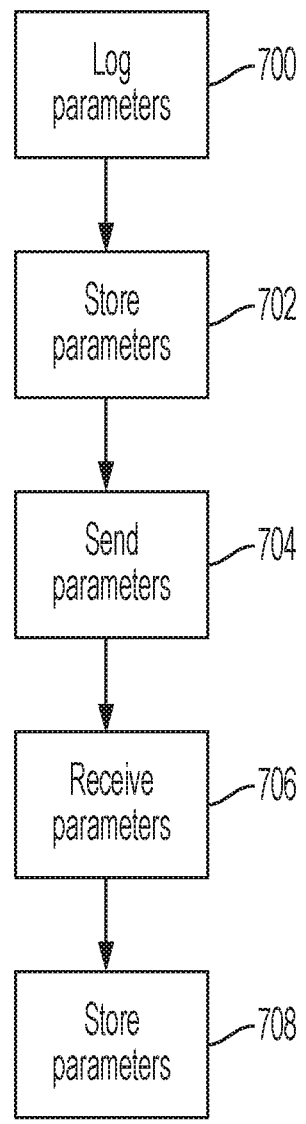
FIG. 7 illustrates a flow chart of an example method of updating a machine-learning model for one or more print devices according to an embodiment.

FIG. 7 illustrates a flow chart of an example method of updating a machine-learning model for one or more print devices according to an embodiment. As illustrated in FIG. 7, one or more print devices may log 700 one or more parameters.

The print devices may be part of a fleet associated with a particular provider or location. For instance, the print devices may be devices located in a certain facility, or those in locations across all facilities of an organization. In another example, the print devices may be ones that are provided or managed by an operator, regardless of where they are located.

A print device may store 702 the parameters it logs in a local data store. A print device may send 704 at least a portion of the stored parameters to a cloud-based server. A print device may send 704 parameters to a cloud-based server at regular intervals or periodically. Alternatively, a print device may send 704 parameters to a cloud-based server upon request. The cloud-based server may receive 706 the parameters from the print device, and store 708 the parameters in a data store associated with the cloud-based server.

In various embodiments, the cloud-based server may receive parameters from a number of different print devices with which it communicates. The cloud-based server may compile and store these parameters to provide a more comprehensive data set across machines. The cloud-based server may use the received parameters to update or train one or more machine-learning models maintained by the cloud-based server. For instance, a cloud-based server may maintain a machine learning model that it may use to determine one or more decurler setpoints for a print device and/or media type to achieve a reduced amount of curl on the media, as discussed in more detail below.

Figure 8:
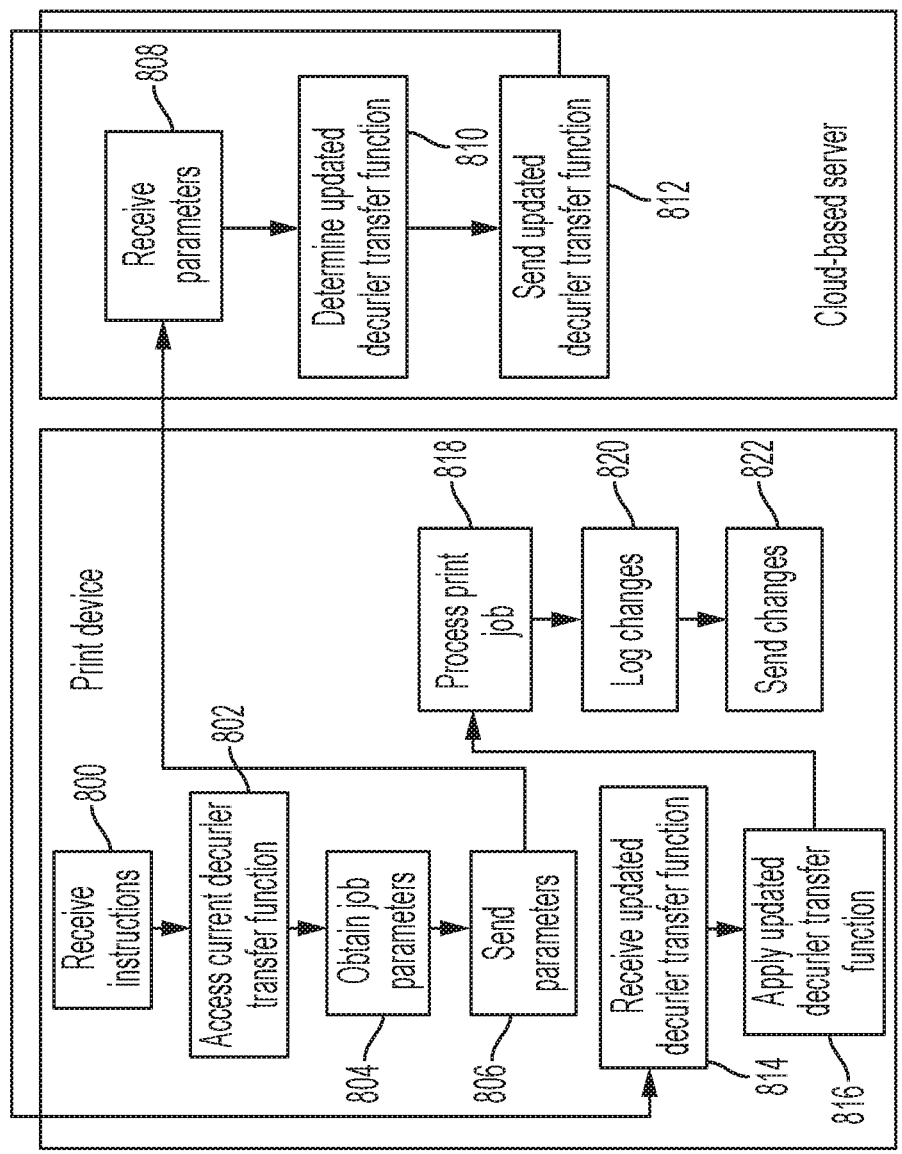
FIG. 8 illustrates a flow chart of an example method of obtaining a decurler transfer function.

FIG. 8 illustrates a flow chart of an example method of obtaining a decurler transfer function according to an embodiment. A decurler transfer function refers to a mathematical model of a decurler subsystem that maps its input to its output or response. For instance, input to a decurler transfer function may be one or more job parameters as described above. Output or a decurler subsystem response may be a suggested decurler indentation and/or direction for one or more decurlers of the decurler subsystem. In other words, inputs may be one or more variables that may affect curl, while outputs may be one or more decurler settings.

As illustrated by FIG. 8, a print device may receive 800 instructions to print a print job. The instructions may be received from a remote processing device. For example, a user may indicate via the user's laptop, desktop or mobile processing device that a particular job should be printed. As another example, a user may provide input to a print device that a print job is to be commenced.

The print device may access 802 a current decurler transfer function. A current decurler transfer function may be stored by the print device in an associated data store. Alternatively, a print device may request a current decurler transfer function from a remote processing device such as, for example, a cloud-based server. In an embodiment, a current decurler transfer function may reflect a decurler transfer function that was used to process a previous print job. In another embodiment, a current decurler transfer function may be a default decurler transfer function. For example, if this print job is the first time that the print device will process the media or media type, the print device may use a default decurler transfer function.

The current decurler transfer function may indicate a current value for one or more setpoints of one or more decurlers of the print device. For example, a decurler transfer function may include various polynomial expressions, one or more or which may have coefficient values (as explained in more detail below). When a job is run successfully, the decurler transfer function may be updated so that an updated decurler transfer function is associated with that job. For example, one or more of the polynomial coefficients of the transfer function may be updated. When another user runs a similar job, the updated transfer function may be used to update the decurler settings for that job.

The print device may obtain 804 one or more job parameters associated with the print job. In an embodiment, a print device may obtain 804 one or more job parameters from the received instructions to print the print job. For instance, a user submitting a print job to be printed may indicate the type of media that the print job should be printed on, the ink type to use, whether the print job is to be printed on a short edge feed or a long edge feed, whether the print job is to be printed double sided, and/or the like. As another example, a print device may obtain 804 one or more job parameters, such as job length or image placement, from the job itself.

In an embodiment, the print device may obtain 804 one or more job parameters from a user at the print device. For example, a user may provide input at the print device that includes one or more job parameters for the print job.

The print device may send 806 at least a portion of the obtained job parameters to a cloud-based server. The cloud-based server may receive 808 the sent job parameters, and may determine 810 an updated decurler transfer function for the print job. In an embodiment, the print device may determine 810 an updated decurler transfer function for the print job by applying a decurler machine learning model to at least a portion of the received job parameters for the print job. As described in more detail throughout this disclosure, the decurler machine learning model may be trained on job parameters received from one or more print devices for previous print jobs.

In an embodiment, a decurler machine learning model may include a historical print job data store. A historical print job data store may be database, table or other data structure that may store information about one or more historical print jobs processed by one or more print devices in communication with the cloud-based server. FIGS. 9A-9F illustrates an example historical print job data store according to an embodiment. As illustrated by FIGS. 9A-9F, a historical print job data store may store one or more parameter values for one or more historical print jobs. The parameters stored by the historical print job data store in FIGS. 9A-9F include a print device serial number, a temperature of the print device serial number, a humidity level of the environment when the historical print job was processed, a grain direction of the media, a media weight, a media size, an image area coverage amount, an indication of whether the media was uncoated or coated, a media brand, whether the print job was performed duplex or simplex, and setting values associated with each decurler of the print device's decurler subsystem. However, it is understood that additional or alternate parameters may be maintained by a historical print job data store according to this disclosure. In an embodiment, a historical print job data store may be continuously updated as the cloud-based server receives data from print devices.

Referring back to FIG. 8, the cloud-based server may apply a decurler machine learning model to determine 810 an updated decurler transfer function for the received job parameters that will result in a reduced amount of curl in the media being used to process the print job. The updated decurler transfer function may include or reflect one or more updated print device settings, parameters or variables that will reduce curl. For instance, a value of one or more of these settings, parameters and/or variables may be used as a coefficient of the updated decurler transfer function.

The cloud-based server may apply a decurler machine learning model by performing one or more machine learning methods to at least a portion of the data stored by the historical print job data store to determine an updated decurler transfer function best suited for the print job. For example, a cloud-based server may use the job parameters received for a print job as input to one or more machine learning methods, which may compare at least a portion of the job parameters to information included in the historical print job data store to identify similar historical print jobs having similar job parameters. This comparison may result in identifying one or more recommended job parameters for the print job, which the cloud-based server may use to determine an updated decurler transfer function for the print job.

The machine learning model may be consistently updated with new data from one or more jobs across one or more print devices. This aggregate data set may be used to find one or more appropriate coefficients for a transfer function. For example, similarity between jobs may be determined by applying a search algorithm or methodology that uses one or more if-then statements, weights or threshold values, or that determines significance of one or more parameter by analysis of variation. As another example, one or more coefficients may be extrapolated based on the data set for jobs where not all parameter or variable values are the same as historical jobs.

As explained throughout this disclosure, when a job is programmed, an operator selects one or more job attributes for the job. These may include, without limitation, media size (dimension), media weight (GSM), grain direction, media type (e.g., coated, non-coated), brand of media, and/or the like. A print device may collect internal data that may correspond to the processing of the same job. This internal data may include, without limitation, area coverage (e.g., graphical or text, banner, logos and/or the like), drop size (e.g., small, medium, large), amount of toner on media (e.g., toner density), relative humidity, one or more decurler settings (e.g., automatic or manual), fuser temperature and/or the like. One or more of these attributes may be collected and used to update the machine learning model, which may be used to update a transfer function.

In various embodiments, a machine learning model may be trained from decision trees, support-vector machines, neural networks, logistic regression, or any other supervised or unsupervised machine learning method or other techniques as a person of skill in the art will understand, such as those discussed above or other similar processes and algorithms from machine learning.

The following represents an example decurler transfer function according to an embodiment:

$$F(\text{decurler}) = A'(\text{Pixel})^{\alpha'} + B'(\text{paper grain})^{\beta'} +$$
$$\Gamma'(gsm)^{\gamma'} + \Delta'(\text{paper grain} * \text{pixel})^{\delta'} + E(\text{humidity})^{\varepsilon} +$$
$$Z(\text{temperature})^{\zeta} + H(\text{media inversion})^{\zeta} + \ldots \Theta(\text{job length})^{\eta}$$

In this example, "pixel" refers to an input variable pertaining to the pixels of a print job, such as, for instance, pixels per inch (PPI). "Paper grain" refers to an input variable indicating the direction that the grain of the media is running (e.g., long grain or short grain). "GSM" refers to an input variable indicative of the grams per square meter of the media. "Humidity" refers to an input variable indicative of a humidity measurement. "Temperature" refers to an input variable indicative of a temperature measurement. "Media inversion" refers to an input variable indicative of one or more inversion settings. "Job length" refers to an input variable indicative of a number of pages of media of a job.

The coefficients of the example decurler transfer function above (e.g., A', B', I', $\Delta'$, E, Z, H and $\Theta$) represent various coefficients that are a function of each term or variable with which they are associated. One or more of these coefficients may be updated based on the transfer function fit as new data is received. For example, a transfer function for long grain media would have a different coefficient than a transfer function for a short grain media.

The cloud-based server may send 812 the determined updated decurler transfer function to the print device. The print device may receive 814 the updated decurler transfer function, and may apply 816 the updated decurler transfer function. For example, the print device may cause the indentation and/or direction of a decurler of the print device to change based on the value(s) specified by the updated decurler transfer function. For example, one or more settings and setting values depicted by the updated decurler transfer function may be used to adjust indentation on the decurler motor. The print device may apply 816 the updated decurler transfer function by providing one or more setting values indicated by the updated decurler transfer function as input to a control system of the print device. The control system may adjust the indentation or other settings of a decurler so that they align with the updated decurler transfer function.

The print device may process 818 the print job using the updated decurler transfer function. If any of the setpoints associated with a decurler of the print device are changed during processing, the print device may log 820 the changes and send 822 them to the cloud-based server to update the decurler machine learning model. For example, a user may adjust the amount of indentation of a decurler during the processing of the print job. The change in this setpoint may be sent by the print device to the cloud-based server.

Figure 10:
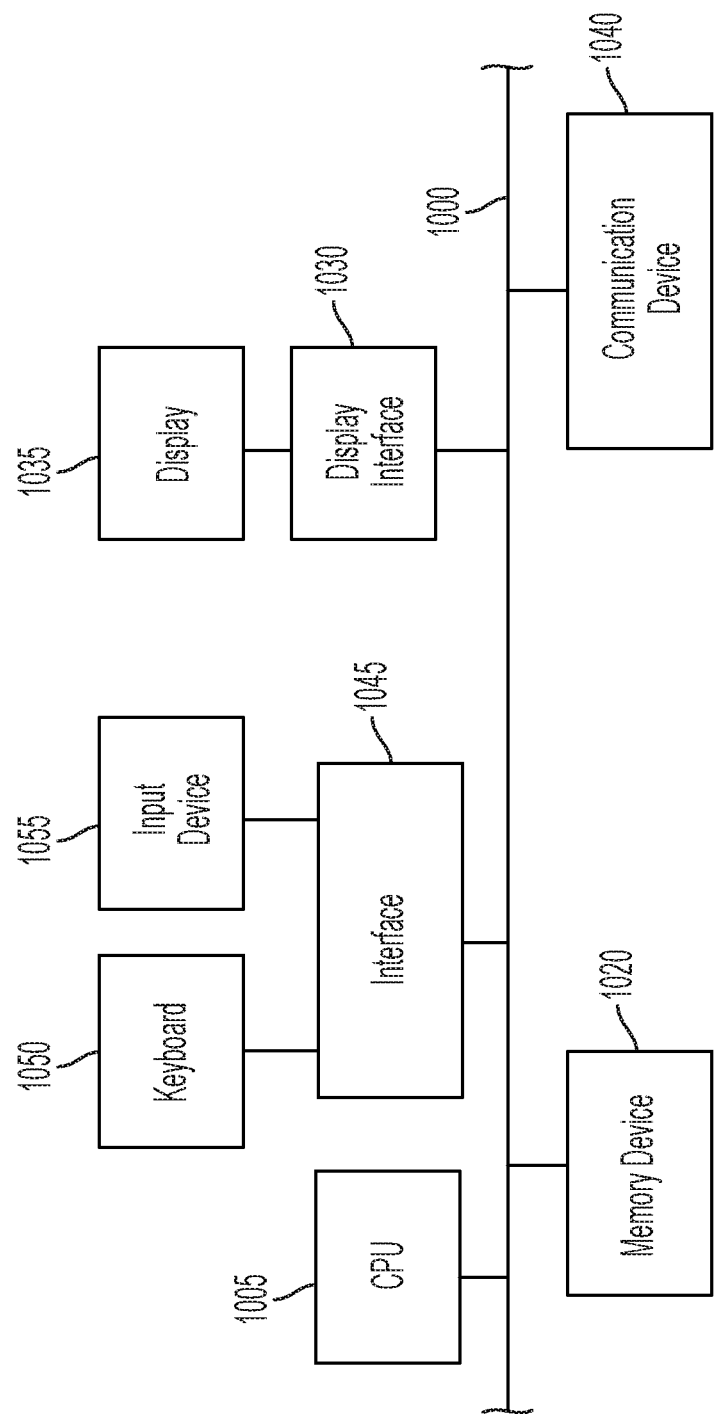
FIG. 10 illustrates a block diagram of example hardware that may be used to contain or implement program instructions according to an embodiment.

FIG. 10 depicts a block diagram of hardware that may be used to contain or implement program instructions, such as those of a cloud-based server, electronic device, virtual machine, or container. A bus 1000 serves as an information highway interconnecting the other illustrated components of the hardware. The bus may be a physical connection between elements of the system, or a wired or wireless communication system via which various elements of the system share data. Processor 1005 is a processing device that performs calculations and logic operations required to execute a program. Processor 1005, alone or in conjunction with one or more of the other elements disclosed in FIG. 10, is an example of a processing device, computing device or processor as such terms are used within this disclosure. The processing device may be a physical processing device, a virtual device contained within another processing device, or a container included within a processing device.

A memory device 1020 is a hardware element or segment of a hardware element on which programming instructions, data, or both may be stored. Read only memory (ROM) and random access memory (RAM) constitute examples of memory devices, along with cloud storage services.

An optional display interface 1030 may permit information to be displayed on the display 1035 in audio, visual, graphic or alphanumeric format. Communication with external devices, such as a printing device, may occur using various communication devices 1040, such as a communication port or antenna. A communication device 1040 may be communicatively connected to a communication network, such as the Internet or an intranet.

The hardware may also include a user input interface 1045 which allows for receipt of data from input devices such as a keyboard or keypad 1050, or other input device 1055 such as a mouse, a touch pad, a touch screen, a remote control, a pointing device, a video input device and/or a microphone. Data also may be received from an image capturing device such as a digital camera or video camera. A positional sensor and/or motion sensor may be included to detect position and movement of the device. Examples of motion sensors include gyroscopes or accelerometers. An example of a positional sensor is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of configuring a decurler subsystem of a print device, the method comprising:
    receiving, by a cloud-based server from a print device via a communication network, one or more job parameters associated with a print job that is to be processed by the print device;
    accessing a historical print job data store comprising one or more historical job parameters associated with one or more historical print jobs processed by the print device or one or more other print devices that are in communication with the cloud-based server;
    comparing at least a portion of the received job parameters to at least a portion of the historical job parameters to identify one or more recommended job parameters for the print job;
    determining an updated decurler transfer function based on the recommended job parameters, wherein the decurler transfer function is indicative of one or more characteristics of one or more decurlers of the decurler subsystem of the print device; and
    sending the updated decurler transfer function to the print device to be applied to the decurler subsystem of the print device.

2. The method of claim 1, wherein receiving one or more job parameters associated with the print job comprises receiving one or more of the following:
    a characteristic of a media on which the print job is to be processed;
    a setting of the print device;
    a characteristic of a consumable that is needed to process the print job; or
    a characteristic of the print job.

3. The method of claim 1, wherein receiving one or more job parameters associated with the print job comprises receiving information pertaining to a profile of a media stack that is to be used to process the print job.

4. The method of claim 3, wherein the information pertaining to the profile of the media stack is obtained from a scanning device of the print device.

5. The method of claim 4, wherein the scanning device comprises one or more of the following:
    a one-dimensional laser scanner;
    a two-dimensional laser scanner;
    a three-dimensional laser scanner;
    a reflective laser profilometer; or
    a photoelectric sensor.

6. The method of claim 1, wherein receiving one or more job parameters associated with the print job comprises receiving temperature information obtained by a temperature sensor of the print device.

7. The method of claim 1, wherein receiving one or more job parameters associated with the print job comprises receiving humidity information obtained by a humidity sensor of the print device.

8. The method of claim 1, further comprising:
    receiving, from one or more of the other print devices, one or more second job parameters; and
    updating the historical print job data store to reflect at least a portion of the second job parameters.

9. The method of claim 1, wherein determining an updated decurler transfer function based on the recommended job parameters comprises applying one or more machine learning methods to at least a portion of the one or more historical job parameters.

10. The method of claim 1, wherein:
    the updated decurler transfer function comprises one or more polynomial expressions and one or more coefficients,
    each polynomial expression corresponds to a decurler input variable,
    each coefficient corresponds to one of the polynomial expressions,
    determining an updated decurler transfer function based on the recommended job parameters comprises applying one or more machine learning methods to at least a portion of the one or more historical job parameters to determine an updated value of one or more of the coefficients.

11. The method of claim 1, further comprising adjusting, by the print device, a direction of a decurler of the decurler subsystem based on the updated decurler transfer function.

12. The method of claim 1, further comprising adjusting, by the print device, an indentation level of a decurler of the decurler subsystem based on the updated decurler transfer function.

13. A system of configuring a decurler subsystem of a print device, the system comprising:
    an electronic device; and
    a computer-readable storage medium comprising one or more programming instructions that, when executed, cause the electronic device to:
        receive from a print device via a communication network, one or more job parameters associated with a print job that is to be processed by a print device,
        access a historical print job data store comprising one or more historical job parameters associated with one or more historical print jobs processed by the print device or one or more other print devices that are in communication with the electronic device,
        compare at least a portion of the received job parameters to at least a portion of the historical job parameters to identify one or more recommended job parameters for the print job,
        determine an updated decurler transfer function based on the recommended job parameters, wherein the decurler transfer function is indicative of one or more characteristics of one or more decurlers of the decurler subsystem of the print device, and send the updated decurler transfer function to the print device to be applied to the decurler subsystem of the print device.

14. The system of claim 13, wherein the one or more programming instructions that, when executed, cause the electronic device to receive one or more job parameters associated with the print job comprise one or more programming instructions that, when executed, cause the electronic device to receive one or more of the following:
- a characteristic of a media on which the print job is to be processed;
- a setting of the print device;
- a characteristic of a consumable that is needed to process the print job; or
- a characteristic of the print job.

15. The system of claim 13, wherein the one or more programming instructions that, when executed, cause the electronic device to receive one or more job parameters associated with the print job comprise one or more programming instructions that, when executed, cause the electronic device to receive information pertaining to a profile of a media stack that is to be used to process the print job.

16. The system of claim 15, wherein the information pertaining to the profile of the media stack is obtained from a scanning device of the print device.

17. The system of claim 16, wherein the scanning device comprises one or more of the following:
- a one-dimensional laser scanner;
- a two-dimensional laser scanner;
- a three-dimensional laser scanner;
- a reflective laser profilometer; or
- a photoelectric sensor.

18. The system of claim 13, wherein the one or more programming instructions that, when executed, cause the electronic device to receive one or more job parameters associated with the print job comprise to one or more programming instructions that, when executed, cause the electronic device to receive one or more of the following:
- temperature information obtained by a temperature sensor of the print device; or
- humidity information obtained by a humidity sensor of the print device.

19. The system of claim 13, wherein the computer-readable storage medium further comprises one or more programming instructions that, when executed, cause the electronic device to:
- receive, from one or more of the other print devices, one or more second job parameters; and
- update the historical print job data store to reflect at least a portion of the second job parameters.

20. The system of claim 13, wherein the one or more programming instructions that, when executed, cause the electronic device to determine an updated decurler transfer function based on the recommended job parameters comprise one or more programming instructions that, when executed, cause the electronic device to apply one or more machine learning methods to at least a portion of the one or more historical job parameters.

21. The system of claim 13, wherein:
- the updated decurler transfer function comprises one or more polynomial expressions and one or more coefficients,
- each polynomial expression corresponds to a decurler input variable,
- each coefficient corresponds to one of the polynomial expressions,
- the one or more programming instructions that, when executed, cause the electronic device to determine an updated decurler transfer function based on the recommended job parameters comprise one or more programming instructions that, when executed, cause the electronic device to apply one or more machine learning methods to at least a portion of the one or more historical job parameters to determine an updated value of one or more of the coefficients.

* * * * *